United States Patent [19]

Ripoche

[11] Patent Number: 5,410,426
[45] Date of Patent: Apr. 25, 1995

[54] ELECTROCHROMIC SYSTEM
[75] Inventor: Xavier Ripoche, Paris, France
[73] Assignee: Saint Gobain Vitrage International, Courbevoie, France
[21] Appl. No.: 15,118
[22] Filed: Feb. 9, 1993
[30] Foreign Application Priority Data Feb. 11, 1992 [FR] France ................. 92 01489

[51] Int. Cl.⁶ .............................................. H01B 1/08
[52] U.S. Cl. ..................................... 359/265; 359/268; 359/269; 359/270; 359/271
[58] Field of Search ............... 359/265, 268, 269, 270, 359/271

[56] References Cited

U.S. PATENT DOCUMENTS

| | | |
|---|---|---|
| 4,508,432 | 4/1985 | Freller et al. ............... 359/266 |
| 4,664,934 | 5/1987 | Ito et al. . | |
| 5,124,833 | 6/1992 | Barton et al. ............... 359/269 |
| 5,240,646 | 8/1993 | Gillet et al. ............... 359/265 |

OTHER PUBLICATIONS

Chimicaoggi, Jun. 1989, pp. 41–45 B. Socrati "Electrochromism and Electrochromic Devices".
Japanese Journal of Applied Physics, vol. 28, No. 7, Jul. 1989, Tokyo JP pp. 1290–1291, Y. Sato "Electrochromism in Thermally Oxidized Iridium Oxide Films".
Journal of Applied Physics., vol. 64, No. 7, Oct. 1988, New York US, pp. 3678–3683, W. Estrada & Al, "Electrochromic Nickel-Oxide Based".

Primary Examiner—Joseph A. Popek
Assistant Examiner—Huan Hoang
Attorney, Agent, or Firm—Pennie & Edmonds

[57] ABSTRACT

An electrochromic system comprising a layer of anode electrochromic material with all iridium oxide bass formatted by intensiostatic cycling in a liquid medium comprising a salt of a cation, excluding the proton, that can be inserted in said anode electrochromic material of an alkaline metal.

17 Claims, 2 Drawing Sheets

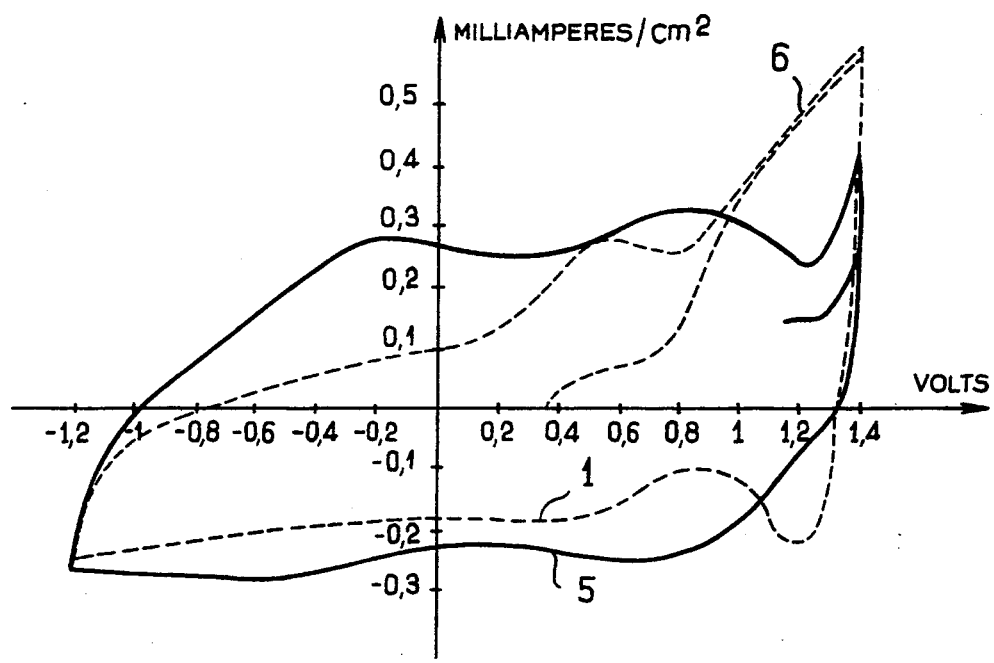
FIG_1
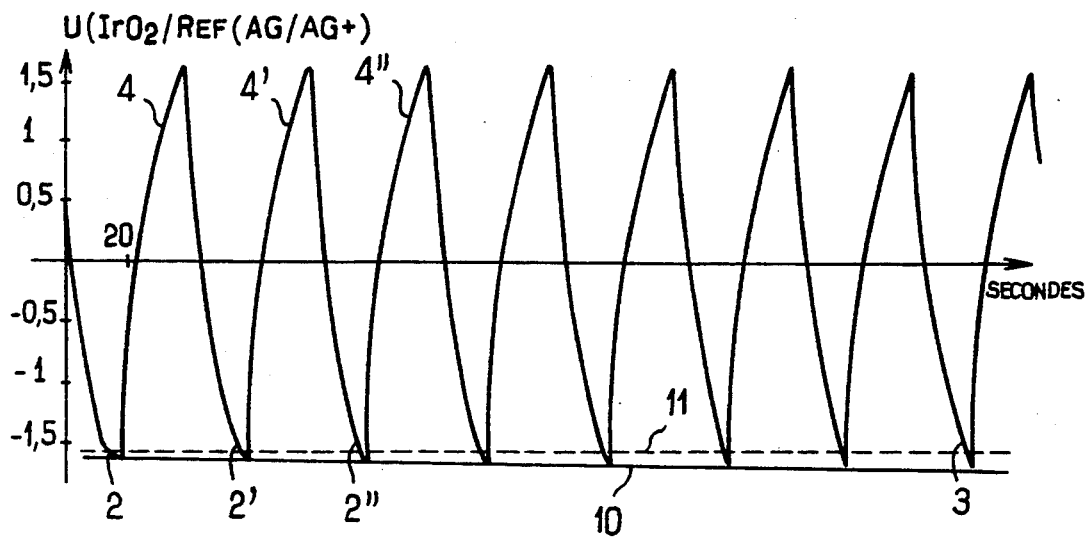
FIG_2

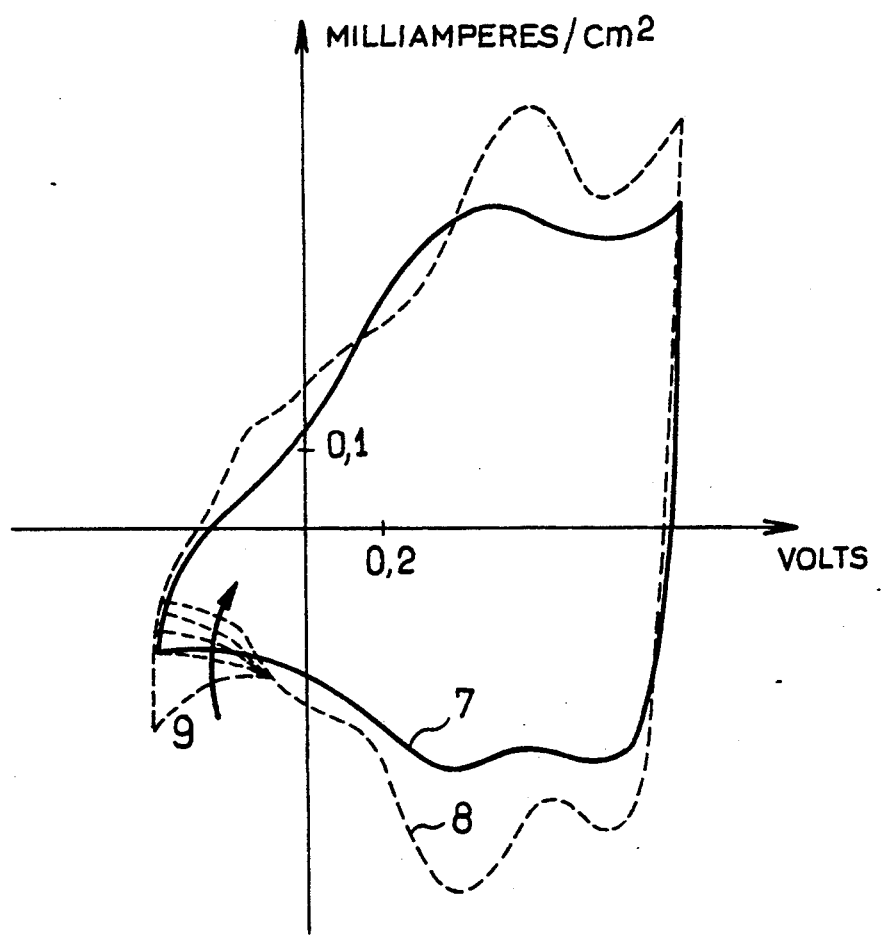
FIG_3

ELECTROCHROMIC SYSTEM

FIELD OF THE INVENTION

This invention relates to electrochromic systems, i.e. to systems whose state of coloration can vary in a reversible way by the passing of an electric current.

BACKGROUND OF THE INVENTION

The electrochromic systems that are the object of this invention consist of a stack of thin layers deposited on a transparent substrate such as a glass sheet, a second substrate—itself also transparent in the case of a system operating by transmission—preferably covering the unit. This stack comprises at least one layer of an electrochromic material that can insert lithium cations, protons or ions generally in a reversible way and whose inserted or removed states exhibit different colorations.

The most used electrochromic materials are transition metal oxides whose change of coloration is due to an electrochemical process of insertion of the cation leading to a change of the degree of oxidation of the metal. These materials are divided into two groups, those with cathodic coloration which take on color during an insertion such as the oxides of tungsten, molybdenum, niobium, titanium and those with anodic coloration which are bleached during an insertion such as the oxides of nickel, iridium, rhodium or cobalt.

So that the electrochemical reaction occurs, it is necessary that the stack comprises on one side of the layer of electrochromic material a source of cations, consisting of a layer of an ionic conductive electrolyte and on the other side a source of electrons consisting of an electroconductive layer. Further, it is well known that behind the ionic conductive electrolyte, it is very advantageous to provide a counter electrode able to receive the cations released during the removal phase then to restore them in insertion phase. This counter electrode should, moreover, in a system operating by transmission, be in a colorless or bleached state when the main electrode is itself in the bleached state. it is easily seen that this role can be more particularly held by an electrochromic material having an inverse operation relative to that of the main layer; the most ordinary electrochromic systems are therefore primarily based on pairs of cathode and anode electrochromic materials, the term of counter electrode being reserved for the less high-performing of these materials from the standpoint of the coloration intensity obtained.

In U.S. Pat. No. 4,664,934, a system based on the reversible insertion of protons, with a pair of tungsten oxide/iridium oxide electrochromic materials has thus been proposed. This same pair has also been used for systems based on the reversible insertion of lithium ions. The selection of iridium oxide as anode electrochromic material is linked to its good resistance to corrosion in acid or basic medium and to the fact that its coloration which tends toward brown does not interfere too greatly with the midnight blue coloration of the tungsten oxide layer.

Nevertheless, the iridium oxide has the defect of exhibiting a residual coloration in its so-called bleached state, which is particularly troublesome in a system operating by transmission, such as, for example, a window.

SUMMARY OF THE INVENTION

The invention has as its object an improvement to electrochromic systems in the composition of which a thin layer of iridium oxide is used as anode electrochromic material. The invention applies in particular to the production of glazings with electrically controlled transmission intended for controlling the solar input in buildings or in motor vehicles. The present invention has specifically as its object to remedy the drawback of iridium oxide, as discussed above, by providing electrochromic systems comprising a thin layer of anode electrochromic material with an iridium oxide base which exhibits a weaker residual coloration and thereby with an improved contrast.

The object of this invention consists of an electrochromic system whose counter electrode with an iridium oxide base has undergone a formatting by intensiostatic cycling in a liquid medium comprising a protonic salt whose cation is able to be inserted in the iridium oxide layer, in particular an alkaline metal and preferably lithium.

The formatting can be achieved with all types of cations able to be inserted, such as, for example, the cations of alkaline metals, or else of silver, of ammonium copper, etc., ions of greater dimensions seeming to have a more important effect of modification of the structure of the layer. On the other hand, it is not possible to achieve it with an acid, therefore in protonic medium, the latter directly attacking the layer.

In practice, and for questions primarily of kinetics of insertion reactions, a lithium salt, such as, for example, lithium trifluoromethanesulfonate ($LiCF_3SO_3$) is selected to be used in solution in propylene polycarbonate (PC).

The intensiostatic cycling is performed by producing a 3-electrode circuit, with a reference electrode, preferably of silver (Ag/Ag+), a counter electrode for example of platinum, the third electrode or tested electrode consisting of the layer of anode electrochromic material with an iridium oxide base deposited on a substrate coated with an electroconductive layer. The potential applied between the iridium oxide electrode and the working electrode is such that the intensity of the current measured between the tested iridium oxide electrode and the counter electrode is constant during the period of each phase of insertion or of removal.

The intensiostatic cycling—where a current is required—therefore basically differs from other known cycling means such as the voltametric or the potentiostatic cycling where given voltages are required between the tested electrode and the counter electrode as a function of the potential applied between the tested electrode and the reference electrode.

It is well known that such a voltametric cycling of a native layer of electrochromic material, and in the case of iridium oxide, lead to a very slight increase of its performances, and more particularly to a reduction of the light transmission in the colored state, the layer having, as it were, need of a certain "lapping". Nevertheless, this "lapping" is achieved after about ten voltametric cycles, provides a gain of at most 10 to 15% over the amount of inserted charges and primarily does not improve in a satisfactory way the light transmission in the bleached state which remains much less than 60%, in the usual case of a thickness between 40 and 80 nanometers. These values are to approach the value on the order of 80% of the light transmission of an indium oxide layer doped with tin, with a square resistance of 5 ohms. The iridium oxide layer therefore leads to a clear reduction of the performances in bleached state.

On the other hand, by performing according to the invention a cycling with constant current, it is possible to obtain electrochromic layers with an iridium oxide base whose light transmission in the bleached state is much greater than 70% (therefore close to the maximum value of 80%). These layers further exhibit a contrast, i.e., a ratio between the light transmissions in the bleached and colored states, much greater than 2, which is particularly remarkable for this electrochromic material.

During the intensiostatic cycling, the applied voltage can reach values appreciably greater than the values accepted for the operation of the electrochromic system. Nevertheless, under the conditions employed, the system does not appear degraded even after several hundred cycles. However, the maximum effect seems to be obtained after about ten cycles. Also this phase of the cycling is preferably limited in its period to avoid any risk of degrading the layer.

As indicated above, the formatted layers according to the invention can be used in systems based on the reversible insertion of lithium ions—and in this case the intensiostatic cycling will be stopped after an insertion phase—or in systems based on the reversible insertion of protons, the intensiostatic cycling then being stopped after a removal phase therefore after the evacuation of the lithium ions. We recall that such a formatting procedure is totally inoperative in protonic medium, the tungsten oxide layer then being totally degraded. The formatted layer of anode electrochromic material is preferably associated with a layer of cathode electrochromic material having a tungsten oxide base with which it thus constitutes the counter electrode of the electrochromic system.

The amount of charge inserted then removed during each intensiostatic cycle is preferably on the order of the insertion capacity of the layer of cathode electrochromic material of the system, insertion capacity which in a well known way can be determined by voltametric cycling. Further, for an iridium oxide layer of 55 nanometers, or more generally between 40 and 80 nanometers, deposited by magnetron cathode sputtering, it has been found that the formatting appreciably improves the contrast, i.e., the ratio between the light transmission in the bleached state and the light transmission in the colored state, if an amount of charges for each cycle between 20 and 40 mC and preferably on the order of 30 mC is met, this last value being on the order of the insertion capacity of a layer of tungsten oxide of 350 nanometers.

BRIEF DESCRIPTION OF THE DRAWINGS

Other advantageous details and characteristics of the invention will come out from the description given below with reference to the accompanying drawings which represent:

FIG. 1 is a graph showing the voltanograms of LiCF$_3$SO$_3$ electrolyte of an iridium oxide layer before and after formatting according to the invention;

FIG. 2 is a diagram showing the evolution, during the intensiostatic cycling, of the potential measured during the time between the iridium oxide layer and the reference electrode Ag/Ag+; and FIG. 3 is a graph showing the voltanograms of H$_3$PO$_4$ electrolyte of an iridium oxide layer before and after formatting according to the invention.

DETAILED DESCRIPTION OF THE INVENTION

The iridium oxide layers have been deposited by cathode sputtering assisted by a magnetic field under a pressure of 6 millitorrs of an oxygen-hydrogen gas mixture, in an 80–20 ratio. These layers are deposited on a transparent substrate, here a float glass sheet 3 cm thick, coated with a transparent electroconductive layer. The layer is 400 nanometers of indium oxide doped with tin, deposited by magnetron cathode sputtering and whose square resistance is 5 ohms with a light transmission of 80%.

The thus coated substrate is placed in a cell of 3 electrodes comprising as electrolyte lithium trifluoromethanesulfonate in solution in propylene carbonate, a reference electrode Ag/Ag+ consisting of a silver wire in contact with a 0.01M silver perchlorate solution dissolved in propylene carbonate, and a platinum counter electrode. The third electrode consists of the substrate with its iridium oxide layer.

In a first step, the native layer, before formatting, has been tested by cyclic voltametry, with a scanning speed of 0.02 volt per second. The voltamogram—i.e., the representative curve of the variation of the intensity (in mA/CM$^2$) of the current passing between the electrode and the counter electrode as a function of the potential applied to the electrode relative to the reference electrode—corresponding to this native layer is indicated by 1 (dotted lines) in FIG. 1. It should be noted that it corresponds to a "lapped" layer whose voltamogram therefore remains constant from one cycle to the next. This native layer exhibits in colored state a light transmission equal to 32%. But primarily, this light transmission is only 55% while by way of comparison, the light transmission in the bleached state of a tungsten oxide layer is greater than 80%. Such a nonformatted layer therefore has the effect of a certain opacification of the electrochromic system that is particularly troublesome if the latter is to be used for applications requiring high maximum light transmissions.

In a second step, this same native layer was formatted by intensiostatic cycling by taking up the same 3-electrode assembly but by requiring for each coloration-bleaching cycle a current of 1.5 mA/cm$^2$ for 20 seconds, then an inverse current of $-1.5$ mA/cm$^2$ again for 20 seconds. These values have been selected for an iridium oxide layer of 55 nanometers, in each cycle. Thus a charge of 30 millicoulombs per square centimeter is inserted then removed. In FIG. 2, the potential between the iridium oxide electrode and the reference electrode was represented as a function of the time passed in seconds.

The amount of inserted charges depends to a certain extent on the thickness of the iridium oxide layer. The values indicated above are suitable for ordinary thicknesses between 40 and 80 nanometers. For greater thicknesses, the charge is to be increased, either by increasing the time of each cycle or by increasing the intensity of the current.

In such an intensiostatic cycling, the reference electrode is used only to measure the potential. In practice, the values of the potential do not have to be measured, only the current required between the iridium oxide electrode and the counter electrode being of consequence.

On the other hand, in the example given here, this counter electrode is platinum, but any other conductive material can also be suitable. Another iridium oxide electrode which will thus be formatted simultaneously or more exactly with an offset half cycle can in particular be used.

It should be noted further that if the surface or the glass plates is large, it can prove useful to limit the intensity of the current to be free of problems of ohmic drops in the electrolyte and irregularity of potentials on the surfaces, the amount of charges being kept constant by increasing the time of each cycle.

In this FIG. 2, it is noted first of all that the measured potential reaches values much greater than those applied during the cyclic voltametry, and this more particularly in insertion, therefore bleaching, phase, the bleaching range beginning at $-1.2$ volts in the case of FIG. 1, while during the formatting of values less than $-1.5$ volts are observed. Further, at the beginning of the intensiostatic cycling, the presence of a plateau 2 which gradually grows indistinct (2—2'—2") until disappearing after 8-10 cycles (peak 3) is observed. Moreover, the corresponding anodic potential gradually increases (in absolute value) as straight line 10 which gradually deviates from horizontal line 11 shows. The same phenomenon, although hardly visible in FIG. 2, seems to occur in removal phase (thinning of peaks 4—4'—4 . . . over time). A modification in the surface of the iridium oxide layer therefore occurs probably with a structural affect, characterized by a displacement of the insertion peaks, the appearance of other peaks on the voltamogram and the offset of the excess voltage of oxygen release toward the high anodic potentials.

The intensiostatic cycling has been conducted for 15 cycles or 600 seconds and the iridium oxide layer has again been tested by voltametry, the corresponding voltamogram is represented by curve 5 of FIG. 1. It clearly appears that the voltamogram obtained is very different from that of the nonformatted layer and defines a greater area, in other words the amount of inserted then removed charges is clearly greater. Furthermore, the attenuation of maximum peak 6 is noted at the end of the removal phase which corresponds to the release of the oxygen. After formatting, this release appears for higher voltages, which is the sign that at least superficial structural modifications have taken place.

This increase of the insertion/removal capacity of the layer is reflected by a very important modification of the optical performances, the light transmission in the bleached state going from 55% to 74%, while the light transmission in colored state remains virtually unchanged. In practice, it increases slightly to reach 35%, a phenomenon which could be attributed to "cleaning" the iridium oxide layer during the formatting. It should be noted that this very slight degradation of the coloration performances is in no way troublesome since the iridium oxide layer is more particularly intended to be used as counter electrode in an electrochromic system whose main electrode has a tungsten oxide base, the state of the system then being primarily linked to the coloration of the tungsten oxide layer. More meaningful, on the other hand, is the improvement of the contrast which goes form 1.7 to 2.2 here.

In the example reported above, 15 formatting cycles have been performed, each cycle comprising 20 seconds at $-1.5$ mA per square centimeter then 20 seconds at $+1.5$ mA per square centimeter. in practice, about ten cycles seem sufficient, a larger cycle number seeming to be able to be performed without damage for the system. Further, while respecting the identity of the amounts of charges, it is possible to proceed with different insertion and removal phase periods, or, for example, 20 seconds at $-1.5$ mA for the insertion then 40 seconds at 0.75 mA for the removal. In the case of surfaces of large sizes, a decision will rather be made in favor of low current surface densities to avoid operating with intensities that are too great and creating inequalities of potential on the surface to be treated.

The formatting according to the invention can also be used for an iridium oxide layer intended for an electrochromic system based on the reversible insertion of protons. For this purpose, a native layer prepared as above has been formatted in $LiCF_3SO_3$ medium, for 14 cycles and a half—therefore by terminating the formatting procedure with a removed layer. Then, this layer was tested by cyclic voltametry but this time in $H_3PO_4$ medium. FIG. 3 shows the voltamograms recorded under these conditions before (curve 7) and after (curve 8) formatting. As above, the amount of charges inserted and removed is clearly increased. This improvement is found at the level of the optical performances, the light transmission being now 80% in bleached state.

In this FIG. 3, the presence of a peak 9 in insertion phase, a peak which gradually grows indistinct and which probably corresponds to the throwing out toward the electrolyte of some lithium ions not totally removed at the end of formatting, is also observed.

I claim:

1. Electrochromic system comprising a layer of anode electrochromic material with an iridium oxide base, said anode electrochromic material formatted, prior to assembly of said electrochromic system, by intensiostatic cycling in a liquid medium comprising a salt of a cation, excluding the proton, that can be inserted in said anode electrochromic material, such that the light transmission of said formatted anode electrochromic material is greater than that of the unformatted anode electrochromic material.

2. Electrochromic system according to claim 1, wherein the electrochromic system is based on the reversible insertion of protons.

3. Electrochromic system according to claim 1, wherein the electrochromic system is based on the reversible insertion of lithium ions.

4. Electrochromic system according to claim 1, wherein said cation is a cation of an alkaline metal.

5. Electrochromic system according to claim 4, wherein said alkaline metal is lithium.

6. Electrochromic system according to claim 1 wherein said anode electrochromic layer is associated with a layer of cathode electrochromic-material having a tungsten oxide base layer that has an insertion capacity.

7. Electrochromic system according to claim 6 wherein the intensiostatic cycling comprises a charge insertion phase and a charge removal phase.

8. Electrochromic system according to claim 7, wherein between 10 and 15 insertion/removal cycles are performed.

9. Electrochromic system according to claim 7 wherein the amount of charge inserted and removed is equal to the charge insertion capacity of the tungsten oxide layer, where said capacity is measured by voltametric cycling.

10. Electrochromic system according to claim 7, wherein for each intensiostatic cycle, a charge between 20 and 40 mC for an iridium oxide layer with a thickness between 40 and 80 nanometers is inserted and removed.

11. Electrochromic system according to claim 10 wherein the charge for each intensiostatic cycle is 30 mC.

12. Electrochromic system according to claim 7, wherein the insertion and removal phases have an identical period.

13. Electrochromic system according to claim 12 wherein the insertion and removal phases are 20 seconds each.

14. Electrochromic system according to claim 7, wherein the removal phase has a greater period than the period of the insertion phase.

15. Electrochromic system according to claim 14 wherein the removal phase has a period that is double the period of the insertion phase.

16. Electrochromic system comprising a layer of anode electrochromic material with an iridium oxide base formatted by intensiostatic cycling in a liquid medium comprising a salt of a cation, excluding the proton, that can be inserted in said anode electrochromic material, wherein said liquid medium comprises lithium trifluoromethanesulfonate ($LiCF_3SO_3$) in solution in propylene carbonate (PC).

17. Electrochromic system comprising a layer of anode electrochromic material with an iridium oxide base formatted by intensiostatic cycling in a liquid medium comprising a salt of a cation, excluding the proton, that can be inserted in said anode electrochromic material, wherein the contrast of the layer of formatted anode electrochromic material is greater than 2.

* * * * *